(12) United States Patent
Jensen

(10) Patent No.: US 6,554,367 B2
(45) Date of Patent: Apr. 29, 2003

(54) SIDE DUMP BODY

(75) Inventor: Layton W. Jensen, Thurston, NE (US)

(73) Assignee: Thurston Manufacturing Company, Thurston, NE (US)

(*) Notice: Subject to any disclaimer, the term of this patent is extended or adjusted under 35 U.S.C. 154(b) by 33 days.

(21) Appl. No.: 09/825,094

(22) Filed: Apr. 5, 2001

(65) Prior Publication Data
US 2002/0149254 A1 Oct. 17, 2002

(51) Int. Cl.⁷ .................................................. B60P 1/00
(52) U.S. Cl. ......................................... 298/18; 298/17.7
(58) Field of Search ........................ 298/13, 17.5, 17.6, 298/17.7, 18, 17 R; 296/184

(56) References Cited

U.S. PATENT DOCUMENTS

| 4,619,484 A | * | 10/1986 | Maxey ......................... 298/18 |
| 5,454,620 A | * | 10/1995 | Hill et al. ............. 298/71 R X |
| 5,480,214 A | | 1/1996 | Rogers ........................ 298/17.6 |
| 5,597,211 A | * | 1/1997 | Golden ....................... 298/17.6 |
| 6,056,368 A | * | 5/2000 | Rogers ......................... 298/18 |

* cited by examiner

Primary Examiner—Stephen T. Gordon
(74) Attorney, Agent, or Firm—Thomte, Mazour & Niebergall; Dennis L. Thomte

(57) ABSTRACT

A side dump body is disclosed wherein the bottom wall thereof is formed from overlapping sheet members which are welded together with the bottom wall being either substantially flat or curved. The side walls of the body may also be formed from overlapping sheet members which are welded together.

9 Claims, 4 Drawing Sheets

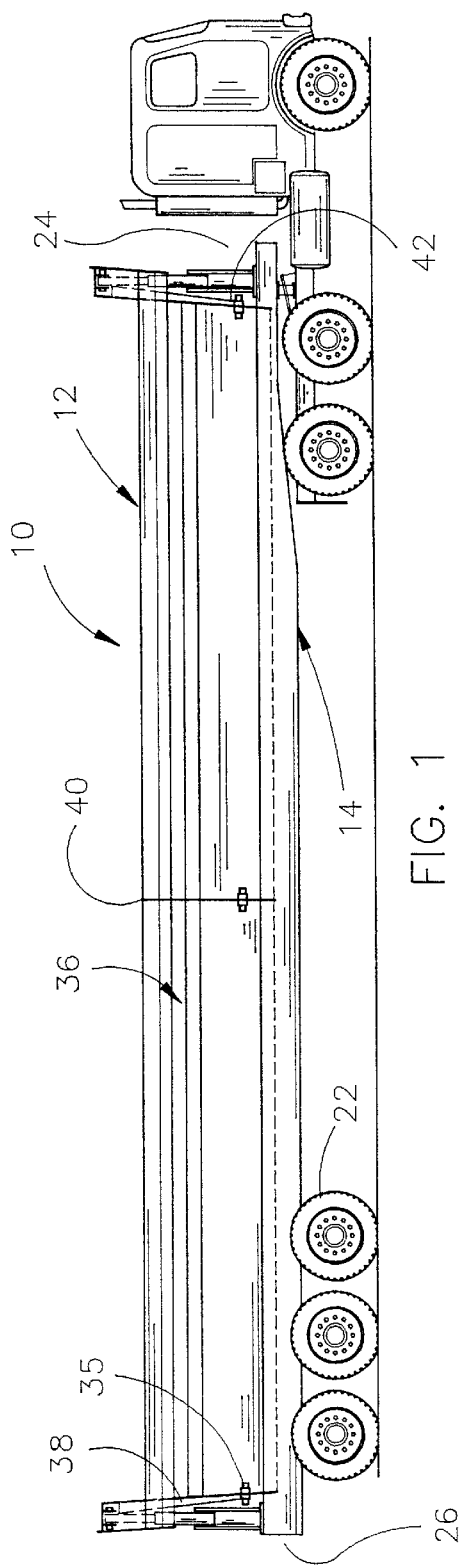
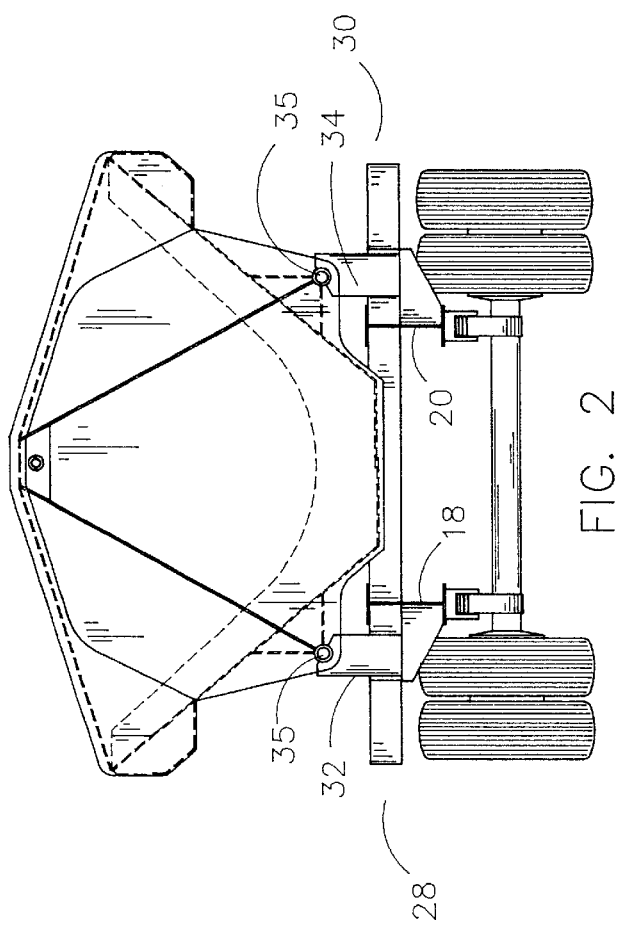

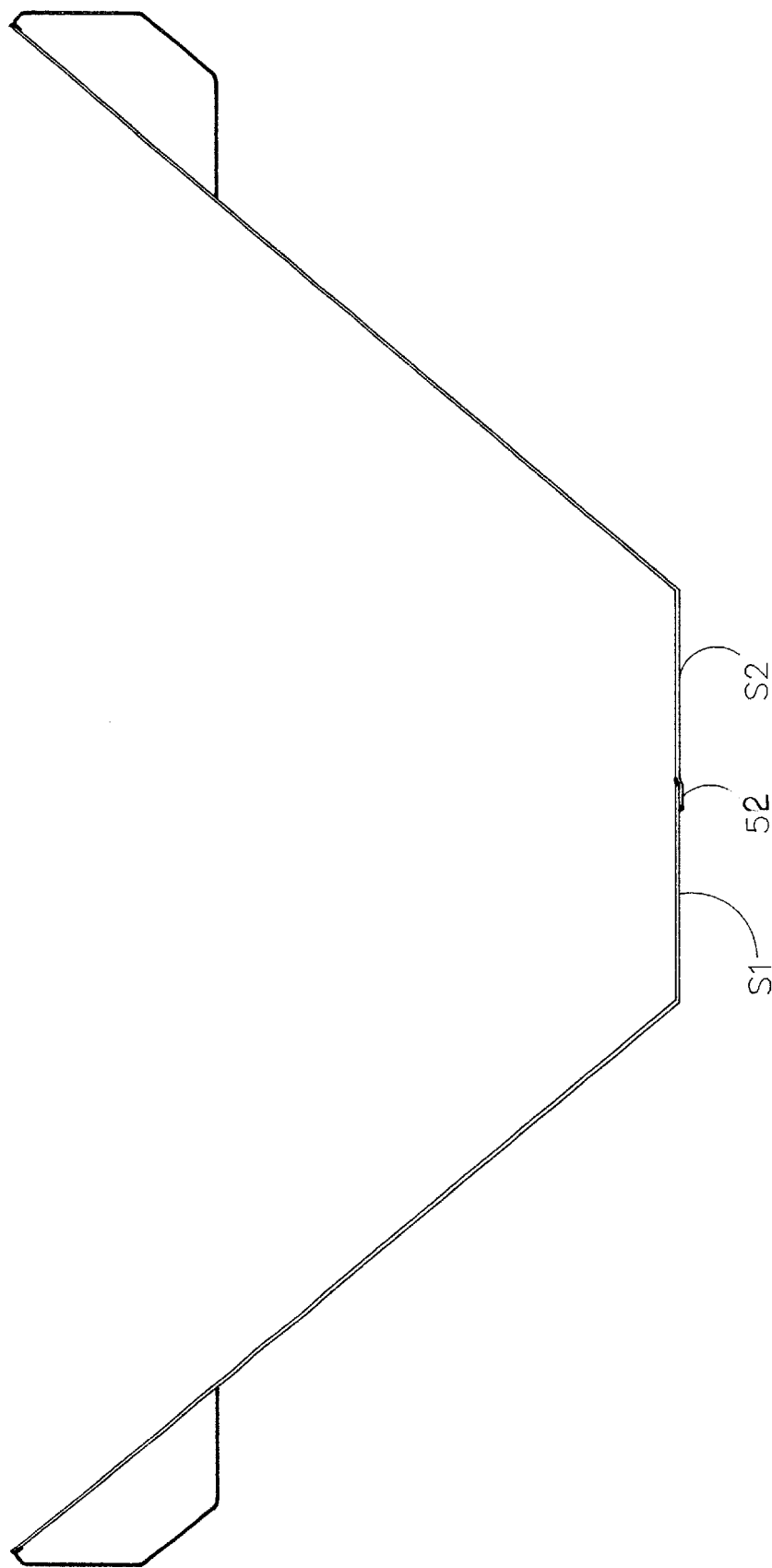

SIDE DUMP BODY

BACKGROUND OF THE INVENTION

1. Field of the Invention

This invention relates to a side dump body and more particularly to a side dump body for use on a trailer or truck wherein the body is welded together in a unique fashion thereby achieving a better weldment with increased strength.

2. Description of the Related Art

Dump bodies which are employed on trailers or trucks normally are of the end dump type or the side dump type. Since the introduction of the side dump body disclosed in U.S. Pat. No. 5,480,214, side dump trucks and trailers have experienced wide acceptance. The side dump trailers such as disclosed in U.S. Pat. No. 5,480,214 normally comprise front and rear bulkheads with a single sheet of metal material extending between the bulkheads with the single sheet of material normally being bent or broken to form the bottom wall and at least a portion of the side walls. The edges of the walls are normally joined together with a butt weldment. It is difficult to position the edges of the sheets together to butt weld the same. Further, the butt weld may not be as strong as desired.

SUMMARY OF THE INVENTION

A side dump body is disclosed which includes an elongated wheeled frame having a plurality of first supports positioned thereon adjacent one side thereof and a plurality of second supports positioned thereon adjacent the other side thereof. An elongated body is pivotally movably mounted on the wheeled frame and is movable between non-dumping and dumping positions. The body may be comprised of rear, intermediate and front bulkheads or just rear and front bulkheads. Metal sheet members are bent to form a bottom wall and opposite side walls which extend upwardly and outwardly from the bottom wall. The bottom wall may be V-shaped, straight or curved. Regardless of whether the bottom wall is V-shaped, straight or curved, the same is formed by overlapping a pair of sheet members at the middle of the bottom wall and welding the same together. The sides of the sheet members, outwardly of the weldment, are bent upwardly to form at least a lower portion of the side walls of the body. The bottom wall may be formed from a single sheet with the sides thereof extending upwardly and outwardly and which are joined to upper side wall portions in an overlapped manner and welded thereto. The overlapping side walls may be used regardless of whether the bottom wall is formed from a single sheet or a pair of overlapped sheets.

Although the dump body of this invention is ideally suited for use as a side dump body, the body construction will work equally as well on an end dump body.

A principal object of the invention is to provide an improved method of constructing the body thereof.

A further object of the invention is to provide a side dump body for use on a trailer or truck wherein the body is welded together in a unique fashion, thereby achieving a better weldment with increased strength.

Still another object of the invention is to provide a side dump body for use on a trailer or truck wherein the bottom wall is formed from a pair of overlapped sheet members with the sheet members being welded together in the overlapped areas.

Still another object of the invention is to provide a side dump body for use on a trailer or truck wherein the side walls of the side dump body may be formed from a pair of sheet members which are overlapped and welded together.

These and other objects will be apparent to those skilled in the art.

BRIEF DESCRIPTION OF THE DRAWINGS

FIG. 1 is a side view of a side dump trailer;

FIG. 2 is a front view of the side dump body;

FIG. 7 is a view similar to FIG. 3 except that a modified form of weldment is used.

DESCRIPTION OF THE PREFERRED EMBODIMENT

Figure 3:
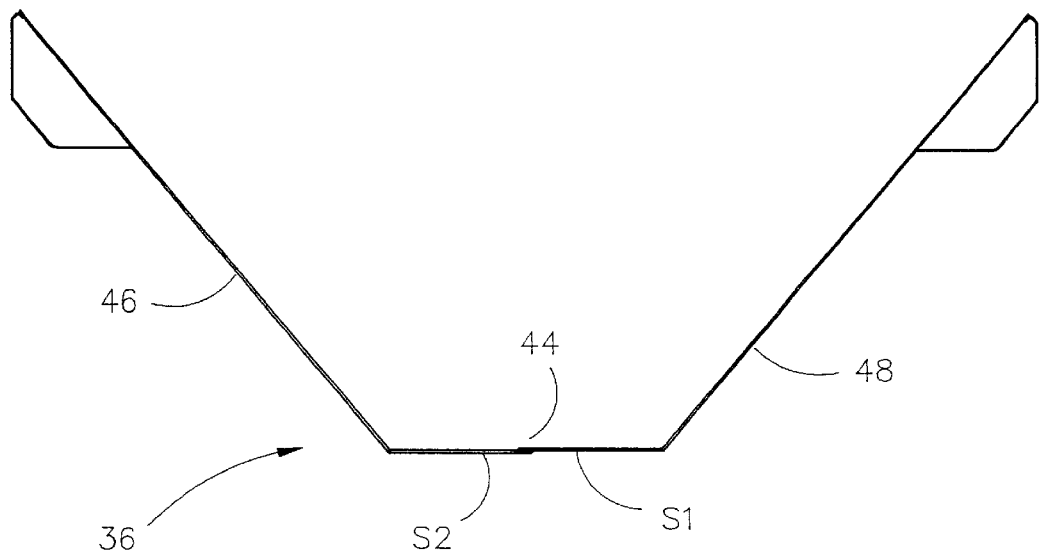
FIG. 3 is an end view of the side dump body illustrating the bottom wall being formed of a pair of sheet members which are overlapped and welded.

The side dump apparatus of this invention is referred to generally by the reference numeral 10 including a side dump unit 12 pivotally mounted on a frame means 14 which may be incorporated into a trailer or into what is commonly called a straight truck.

Frame means 14 normally comprises a pair of longitudinally extending frame members 18 and 20 which are conventionally supported on a running gear 22. For purposes of description, the frame means 14 will be described as including a forward end 24, a rearward end 26, and opposite sides 28 and 30. A plurality of horizontally spaced first supports 32 are secured to the wheeled frame at one side thereof while a plurality of spaced-apart second supports 34 are secured to the wheeled frame at the other side thereof. Pivot pins 35 engage the supports 32 and 34 in conventional fashion.

Side dump unit 12 includes a body or tub 36. Body 36 includes at least a rear bulkhead 38 and a front bulkhead 42. In some cases, an intermediate bulkhead 40 may be utilized.

In FIG. 3, it can be seen that the tub 36 includes a bottom wall 44 and side walls 46 and 48 extending upwardly therefrom. Bottom wall 44 is formed by overlapping a pair of sheet members S1 and S2, as illustrated in FIG. 3, and welding the inner end of sheet member S2 to the top surface of sheet member S1. The inner end of sheet 15 member S1 is welded to the bottom surface of sheet member S2.

Figure 4:
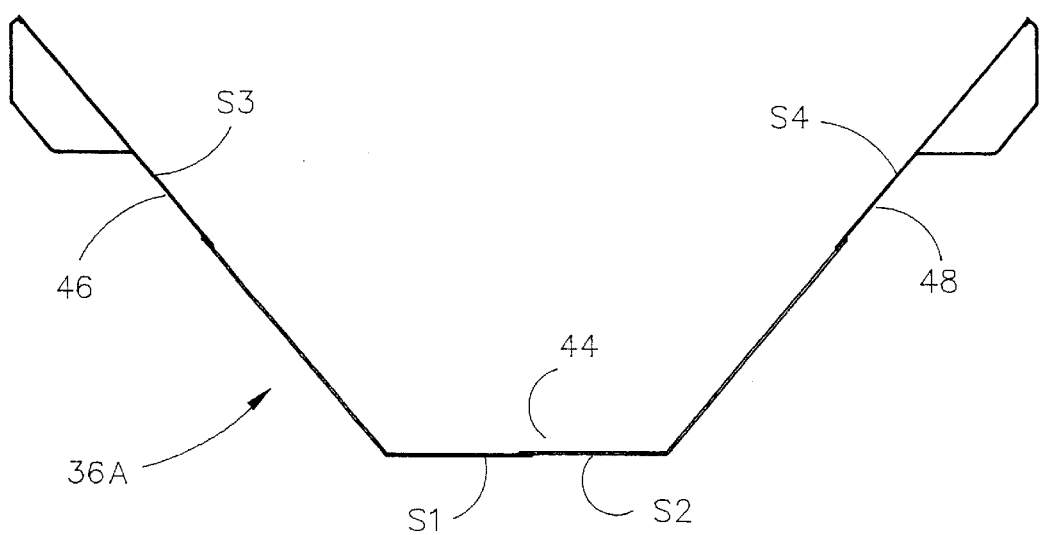
FIG. 4 is a view similar to FIG. 3 except that the side walls of the body are also formed by overlapped sheet members which are welded together.

FIG. 4 illustrates an embodiment of the tub 36A wherein side wall 46 is formed from a pair of sheet members S3 and S1. Side wall 48 is formed from sheet members S4 and S2. The lower ends of sheet members S3 and S4 overlap the upper ends of sheet members S1 and S2 and are welded thereto. The lower edge of sheet member 20 S3 is welded to the inner surface of sheet member S1 and the upper edge of sheet member S1 is welded to the exterior surface of sheet member S3. Similarly, the upper end of sheet member S2 is welded to the exterior surface of sheet member S4 and the lower end of sheet member S4 is welded to the inner surface of sheet member S2.

Figure 5:
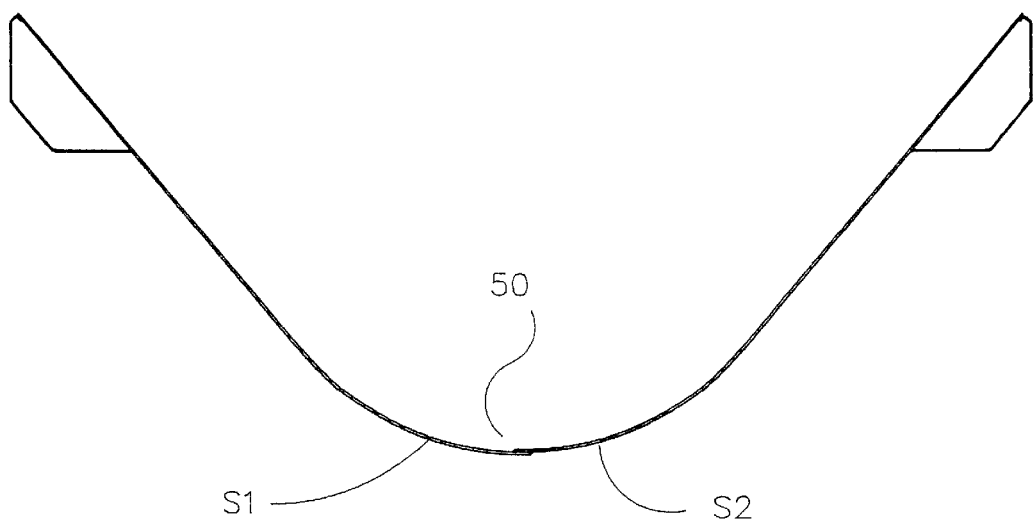
FIG. 5 is a view similar to FIG. 3 except that the bottom wall is curved.
Figure 6:
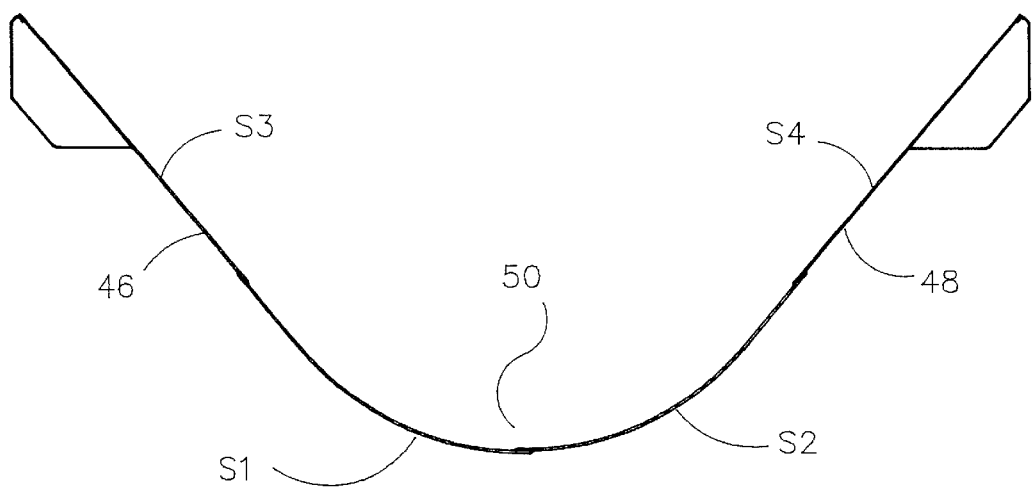
FIG. 6 is a view similar to FIG. 5 except that the side walls of the body are formed from overlapped sheet members welded together.

In the embodiment of FIG. 5, the bottom wall 50 is curved and is formed from a pair of sheet members S1 and S2 similar to that illustrated in FIG. 3, except that the bottom wall 50 is curved. The lower ends of sheet members S1 and S2 overlap one another and welded together as in the embodiment of FIG. 3. FIG. 6 illustrates a further embodiment wherein the side walls 46 and 48 are comprised of overlapping sheet members in the manner of FIG. 4. Side wall 46 in FIG. 6 is formed by overlapping sheet members S1 and S3 while side wall 48 is formed from overlapping sheet members S2 and S4. The overlapping portions of the sheet members in FIG. 6 are welded in the manner as described in the embodiment of FIG. 4. FIG. 7 illustrates a further embodiment and is quite similar to the embodiment of FIG. 3. The only difference between the embodiment of FIG. 7 and that of FIG. 3 is that sheet member S2 is provided with a lip portion 52 which receives the inner end of sheet member S1 so that a relatively smooth interior bottom wall surface is achieved.

In each of the embodiments, the overlapping of the sheet members and the welding together thereof results in a much stronger weldment than if the sheet members were joined together in an end-to-end fashion and then welded. Further, the welding of the sheet members as described herein takes less time than the prior art welding methods.

Thus it can be seen that the invention accomplishes at least all of its stated objectives.

I claim:

1. A side dump apparatus, comprising:

an elongated wheeled frame having a forward end, a rearward end, and opposite sides; thereof;

a side dump body movably positioned on said wheeled frame comprising a rear bulkhead and a front bulkhead with each of the bulkheads having front and rear sides; a bottom wall having front and rear ends and side walls having front and rear ends;

said rear end of said bottom wall and said side walls being welded to said rear bulkhead;

said front end of said bottom wall and said side walls being welded to said front bulkhead;

said bottom wall having a central portion and being comprised of first and second sheet members having inner edges which overlap one another at said central portion of said bottom wall and which are welded together.

2. The side dump apparatus of claim 1 wherein said bottom wall is substantially flat.

3. The side dump apparatus of claim 1 wherein said bottom wall is curved.

4. The side dump apparatus of claim 1 wherein said first and second sheet members each have upper and lower surfaces and wherein said inner edge of said first sheet member is welded to said upper surface of said second sheet member and wherein said inner edge of said second sheet member is welded to said lower surface of said first sheet member.

5. The side dump apparatus of claim 1 wherein said first sheet member has a downwardly stepped portion at its inner edge which receives the inner edge of said second sheet member.

6. A dump apparatus, comprising:

an elongated wheeled frame having a forward end, a rearward end, and opposite sides; thereof a dump body movably positioned on said wheeled frame comprising a bottom wall having front and rear ends and side walls having front and rear ends;

said bottom wall having a central portion and being comprised of first and second sheet members having inner edges which overlap one another at said central portion of said bottom wall and which are welded together.

7. The dump apparatus of claim 6 wherein said bottom wall is substantially flat.

8. The dump apparatus of claim 6 wherein said bottom wall is curved.

9. The dump apparatus of claim 6 wherein said first and second sheet members each have upper and lower surfaces and wherein said inner edge of said first sheet member is welded to said upper surface of said second sheet member and wherein said inner edge of said second sheet member is welded to said lower surface of said first sheet member.

* * * * *